United States Patent [19]

Wu

[11] Patent Number: 5,636,006
[45] Date of Patent: Jun. 3, 1997

[54] APPARATUS AND METHOD FOR SCANNING A BOUND DOCUMENT USING A WEDGE SHAPED PLATEN WITH A MOVING MIRROR

[75] Inventor: Xiaodong Wu, Atherton, Calif.

[73] Assignee: Xerox Corporation, Stamford, Conn.

[21] Appl. No.: 635,438

[22] Filed: Apr. 17, 1996

[51] Int. Cl.$^6$ .................... G03B 27/62; G03G 15/00
[52] U.S. Cl. ................... 355/75; 399/377; 355/25
[58] Field of Search ................... 355/24, 25, 75, 355/82, 230; 358/511, 512; 399/377

[56] References Cited

U.S. PATENT DOCUMENTS

| | | | |
|---|---|---|---|
| 3,888,584 | 6/1975 | Smith | 355/75 |
| 4,068,950 | 1/1978 | Kito | 355/75 |
| 4,585,334 | 4/1986 | Malyon | 355/25 |
| 4,645,332 | 2/1987 | Malyon | 355/25 |
| 4,663,873 | 5/1987 | Shinbrot | 40/531 |
| 4,972,271 | 11/1990 | Koumura | 355/25 X |
| 4,980,720 | 12/1990 | Siegel | 355/233 |
| 5,119,163 | 6/1992 | Rourke et al. | 358/296 |
| 5,212,568 | 5/1993 | Graves et al. | 358/474 |
| 5,276,530 | 1/1994 | Siegel | 358/406 |
| 5,359,207 | 10/1994 | Turner | 257/81 |
| 5,390,033 | 2/1995 | Bannai et al. | 358/498 |
| 5,406,366 | 4/1995 | Kusumoto et al. | 355/327 |
| 5,471,277 | 11/1995 | Fujioka et al. | 355/25 |
| 5,475,505 | 12/1995 | Minasian et al. | 358/474 |

FOREIGN PATENT DOCUMENTS

| | | | |
|---|---|---|---|
| 3546404A1 | 7/1993 | Germany | G02B 27/02 |
| 2158599 | 11/1985 | United Kingdom . | |

OTHER PUBLICATIONS

Agarwal, V.K., "Book Copying Apparatus," Xerox Disclosure Journal, vol. 9, No. 6, Nov./Dec., 1984, p. 383.

Guenther, J., "Library Copier," Xerox Disclosure Journal, vol. 12, No. 5, Sep./Oct., 1987, pp. 231-232.

U.S. Patent Application No. 08/570,880 entitled "Bound Document Imager with Page Turner" to Turner et al., filed on Dec. 12, 1995.

U.S. Patent Application No. 08/570,791 entitled "Bound Document Imager with Air Jet Page Turning System" to Turner et al., filed on Dec. 12, 1995.

*Primary Examiner*—Arthur T. Grimley
*Assistant Examiner*—David A. Lane
*Attorney, Agent, or Firm*—Thomas B. Zell

[57] ABSTRACT

A wedge shaped platen scanner sequentially records opposing pages of a bound document positioned thereon using a single imaging station. A mirror is positioned between the wedges of the platen. A controller positions the mirror in one of two operational positions. In the first operational position, the mirror is positioned so that light emitted by a lamp reflects off of the mirror and onto the single imaging station. In the second operational position, the mirror is moved out of the imaging station's optical path. In each operational position, the lamp sequentially illuminates an opposing page of the bound document with each of the three primary colors: red green, and blue. In both the first and the second operational positions, images of opposing pages of the bound document are focused with optics onto the imaging station. In one arrangement, the imaging station is a two-dimensional array of detectors which sense an image of a page of the bound document projected thereon. In another arrangement, the imaging station is a photoconductive belt which when exposed by either flash lamp records a latent image thereon. In either arrangement, a one page imaging station records opposing pages of a bound document either electronically or on print media, one page at a time.

23 Claims, 4 Drawing Sheets

APPARATUS AND METHOD FOR SCANNING A BOUND DOCUMENT USING A WEDGE SHAPED PLATEN WITH A MOVING MIRROR

Cross reference is made to the co-pending U.S. patent applications Ser. Nos. 08/635,095, and 08/635,100 filed concurrently herewith, and entitled "Apparatus And Method For Scanning A Bound Document Using A Wedge Shaped Platen", and "Apparatus And Method For Scanning A Bound Color Document Using A Wedge Shaped Platen", (Attorney Docket Nos. D/96125 and D/96126), respectively.

The present invention relates generally to a system for scanning a bound document, and more particularly to a method and apparatus for sequentially scanning opposing pages of the bound document with an imager having an image sensing area sufficient to capture one opposing page of the bound document at a time.

BACKGROUND OF THE INVENTION

With the advent of inexpensive digital storage, recording bound documents in a digital format is an important way of preserving information in books, periodicals, manuscripts, or any other document having a bound edge with a hard or soft cover. Content of a page of a bound document is first scanned and then electronically recorded. The recorded digital image can then be manipulated or processed to enhanced forms not originally available in its bound format. For example, digital images recorded on a storage medium can be reproduced audibly using applications that generate speech from ASCII text. Alternatively, bound documents digitally recorded can be reformatted or enhanced with additional information and reproduced on demand as hardcopy using an electronic printing machine such as a laser or ink jet printer.

In order to minimize the stress on the spine of bound documents when capturing or copying image content, wedge or angled platens of scanners and copying machines have been developed. For example, U.S. Pat. No. 3,888,584 to Smith, U.S. Pat. No. 4,068,950 to Kito, and "Book Copying Apparatus," by V. Agarawal, Xerox Disclosure Journal Vol. 9, No. 6, November/December, 1984, p. 383, disclose arrangements for scanning a book on a platen supported horizontally with respect to a support surface. Specifically, an edge of the support surface is arranged to meet a side wall in order that a bound document can be draped over the side of the scanner. While some arrangements provide support for a bound document with a wedge platen having an angle of approximately ninety degrees, other arrangements provide support with wedge platens having angles less than or greater than ninety degrees. For example, Guenther discloses a wedge platen having an angle greater than ninety degrees in "Library Copier," Xerox Disclosure Journal Vol. 12, No. 5, September/October, 1987, pp. 231–232. Alternatively, UK Patent Application GB 2 158 599A, published 1985 to Kobayashi, discloses an electrophotocopier with a wedge platen that is less than ninety degrees.

A principal function of wedge or angled scanning surfaces is to prevent damage to a bound document by minimizing stress applied to its binding as it is held open for scanning in a position as close to the platen of a scanner as possible. Typically when using a flat-bed scanner, a force has to be applied the spine region of a bound document to insure that the document is within the scanner's depth of focus. A wedge or angled platen, however, positions the spine region of a bound document within the scanner's depth of focus without requiring the application of additional force to the document's binding. U.S. Pat. Nos. 4,980,720 and 5,276,530 to Siegel disclose a book scan mode for a flat-bed scanner which minimizes the force typically required to be applied to a binding. In the book scan mode, a page height detector mounted on a scan carriage accounts for the deviation of the book pages from the horizontal platen plane. Alternatively, U.S. Pat. No. 5,475,505 to Minasian et al. discloses a combination flat-bed scanner and wedge shaped scanner. Specifically, Minasian et al. discloses a canted platen input scanner with an adjustable housing support. In a first position, the housing support is canted to facilitate scanning of bound documents, and in a second position the housing support brings the platen to a horizontal position to facilitate scanning other classes of documents.

Additional examples of wedge platens for scanning bound documents include, U.S. Pat. No. 5,359,207 to Turner, German Patent DE-A1 3546404, and U.S. Pat. Nos. 4,585, 334 and 4,645,332 to Malyon. Turner discloses a book scanner with contact imaging that employs two-dimensional sensor arrays that are attached at a common edge and disposed in a wedge shaped manner. German Patent DE-A1 3546404 discloses a roof-shaped book support apparatus for use in a copier application. The optics of the roof-shaped copier arrangement provide that opposing pages of a bound book are simultaneously imaged in the same image plane. Consequently, the roof-shaped book support apparatus must have an sensing area large enough to capture two pages of a bound document at a time. In addition, the roof-shaped copier arrangement adjusts the spacing of the images of both pages in the image plane without having to change the position of the book. Malyon discloses a photocopying device with a V-shaped book rest for supporting and scanning a book in an open condition.

In order to facilitate the copying or reproduction of bound documents a plurality of automatic page taming apparatuses have been developed. Such page mining apparatuses minimize the amount of manual effort required to electronically capture the contents of a bound document. By way of example, U.S. Pat. No. 4,663,873 to Shinbrot, U.S. Pat. No. 5,390,033 to Bannai et al., and U.S. Pat. No. 5,471,277 to Fujioka et al. disclose arrangements for turning pages of a book within a copier. Other page turning arrangements include U.S. patent application Ser. No. 08/570,880 entitled "Bound Document Imager with Page Turner" to Turner et al., filed on Dec. 12, 1995 and assigned to the same assignee as the present invention, and U.S. patent application Ser. No. 08/570,791 entitled "Bound Document Imager with Air Jet Page Turning System" to Turner et al., filed on Dec. 12, 1995 and assigned to the same assignee as the present invention.

Further advances have been made to electronic publishing systems to offer job programming of books on a flat bed scanning system. U.S. Pat. No. 5,119,206 to Rourke et al. discloses a system for printing bound documents. The system can be programmed to scan either a selected side or both sides of the bound document. The attached printing system can then be programmed to print both sides of a page on a common print media sheet or on separate print media sheets. U.S. Pat. No. 5,212,568 to Graves et al. discloses an electronic reprographic apparatus that selectively controls the areas of the document to be imaged. The system enables the user to identify the type of input document so that the potential of imaging beyond document edges or in bound document gutter regions is eliminated.

All references cited above are incorporated herein by reference where appropriate for appropriate teachings of additional or alternative details, features, and/or technical background.

Although the aforementioned wedge scanning systems reduce stress applied to bound edges of documents, most wedge scanning systems scan a single page of a bound document at a time and require that the bound document is repositioned before the opposing page is scanned since only one face of the wedge scanning system is used to record image data. In contrast, other scanning systems such as that disclosed in German Patent DE-A1 3546404 do not require repositioning a bound document in order to image both sides. However, such a scanning system requires an image sensing area sufficiently large to simultaneously capture both pages of the bound document. Similarly, the aforementioned wedge contact scanning system disclosed by Turner requires two two-dimensional flat panel detectors to image opposing pages of a bound document without having to reposition it in order to scan both sides. In addition, such contact imaging arrangements have a reduced depth of focus since it is difficult to provide contact sensors with thin yet durable surface protection. Accordingly, it would be desirable to provide a wedge scanning system with an increased depth of focus. In addition, it would be desirable to provide a wedge scanning system that does not require repositioning a bound document while sequentially imaging opposing sides of the bound document using a sensing area that captures a single opposing page of a bound document at a time.

SUMMARY OF THE INVENTION

In accordance with one aspect of the invention, there is provided an apparatus for scanning a bound document. The apparatus includes a wedge shaped platen having a first transparent surface and a second transparent surface for supporting the bound document in an open condition. A light source illuminates a first opposing page and a second opposing page of the bound document positioned on the first and the second transparent surface of the wedge shaped platen. An imager captures images of the first and the second opposing pages of the bound document on the wedge shaped platen one page at a time. A mirror has a first position when imaging one page, and a second position when imaging the other page. The first position defines a reflective path between the first transparent surface and the imager, and the second position defines an unobstructed optical path between the second transparent surface and the imager.

In accordance with another aspect of the invention, there is provided a method for scanning a bound document supported on a wedge shaped platen having a first transparent surface and a second transparent surface. The method includes the steps of: positioning a mirror in a defined reflective path between one of the first and the second transparent surfaces and an imager; illuminating a first opposing page of the bound document positioned on one of the first and the second transparent surfaces of the wedge shaped platen; recording with the imager a representation of the first opposing page illuminated along the defined reflective path; repositioning the mirror so as to provide an unobstructed optical path between the other of the first and the second transparent surfaces and the imager; illuminating a second opposing page of the bound document positioned on the other of the first and the second transparent surfaces of the wedge shaped platen; and recording with the imager a representation of the second opposing page illuminated along the defined optical path.

BRIEF DESCRIPTION OF THE DRAWINGS

These and other aspects of the invention will become apparent from the following descriptions to illustrate a preferred embodiment of the invention read in conjunction with the accompanying drawings wherein the same reference numerals have been applied to like parts and in which.

DETAILED DESCRIPTION

Figure 1:
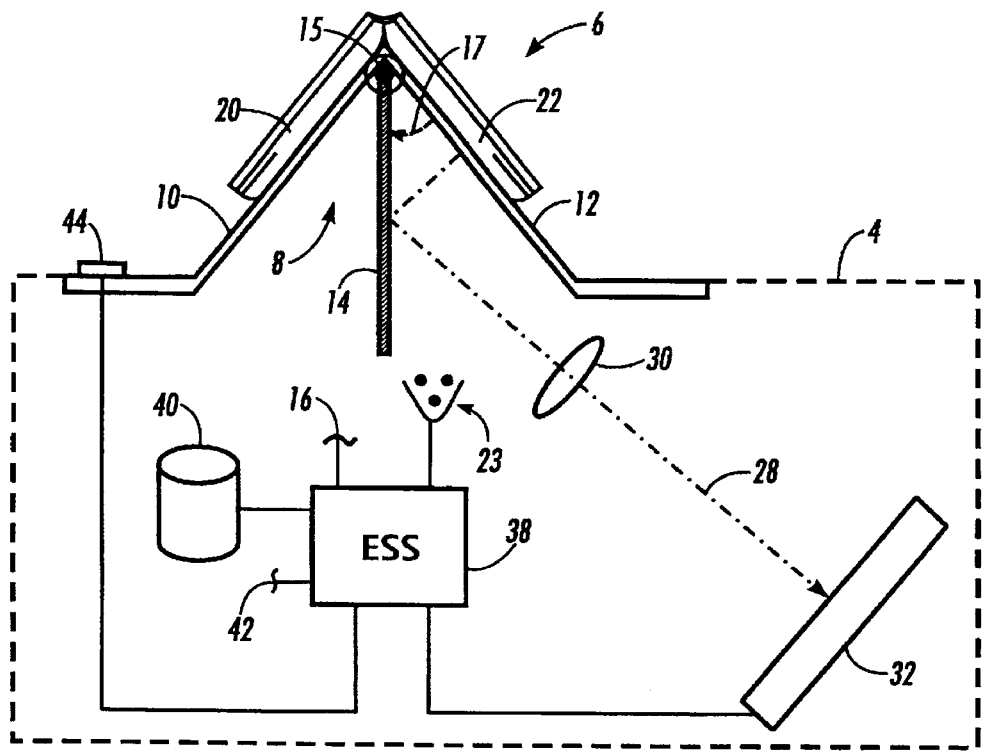
FIG. 1 illustrates a scanning system incorporating the present invention showing a first opposing page of a bound document supported on a wedge shaped platen being recorded by an imager.
Figure 2:
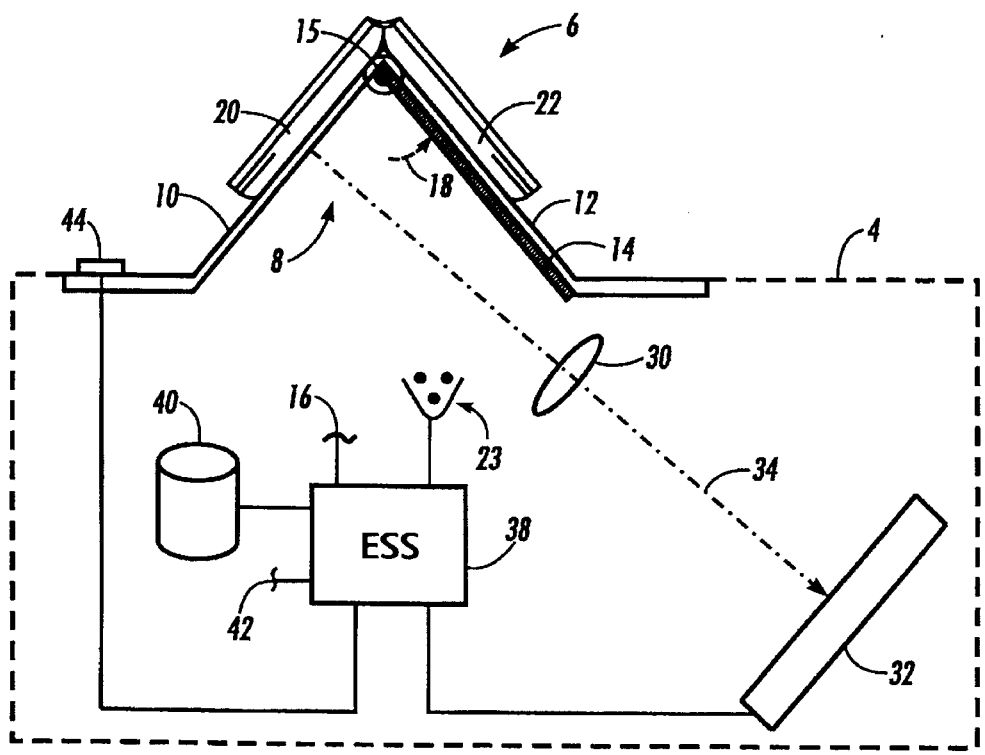
FIG. 2 is the scanning system shown in FIG. 1 showing a second opposing page of a bound document supported on a wedge shaped platen being recorded by the imager.

Referring now to the drawings where the showings are for the purpose of describing the preferred embodiment of the invention and not for limiting same, FIGS. 1 and 2 show a scanning system 4 incorporating the present invention. Scanning system 4 includes a wedge shaped platen 8 adapted for scanning a bound document 6. Bound document 6 is deformed herein as any document having a bound edge such as a book or a periodical. The wedge shaped platen 8 includes a first face 10 and a second face 12 for holding bound input documents in an open position for scanning. Faces 10 and 12 of platen 8 are transparent and can be formed, for example, with any clear glass or plastic. The angled shape of the wedge shaped platen 8 advantageously minimizes stress to the spine region of bound documents when scanning. Unlike flat bed scanners, an angled platen does not require additional pressure to the spine region of a bound document in order for scanned pages to be within the depth of focus of scanning system 4.

Figure 3:
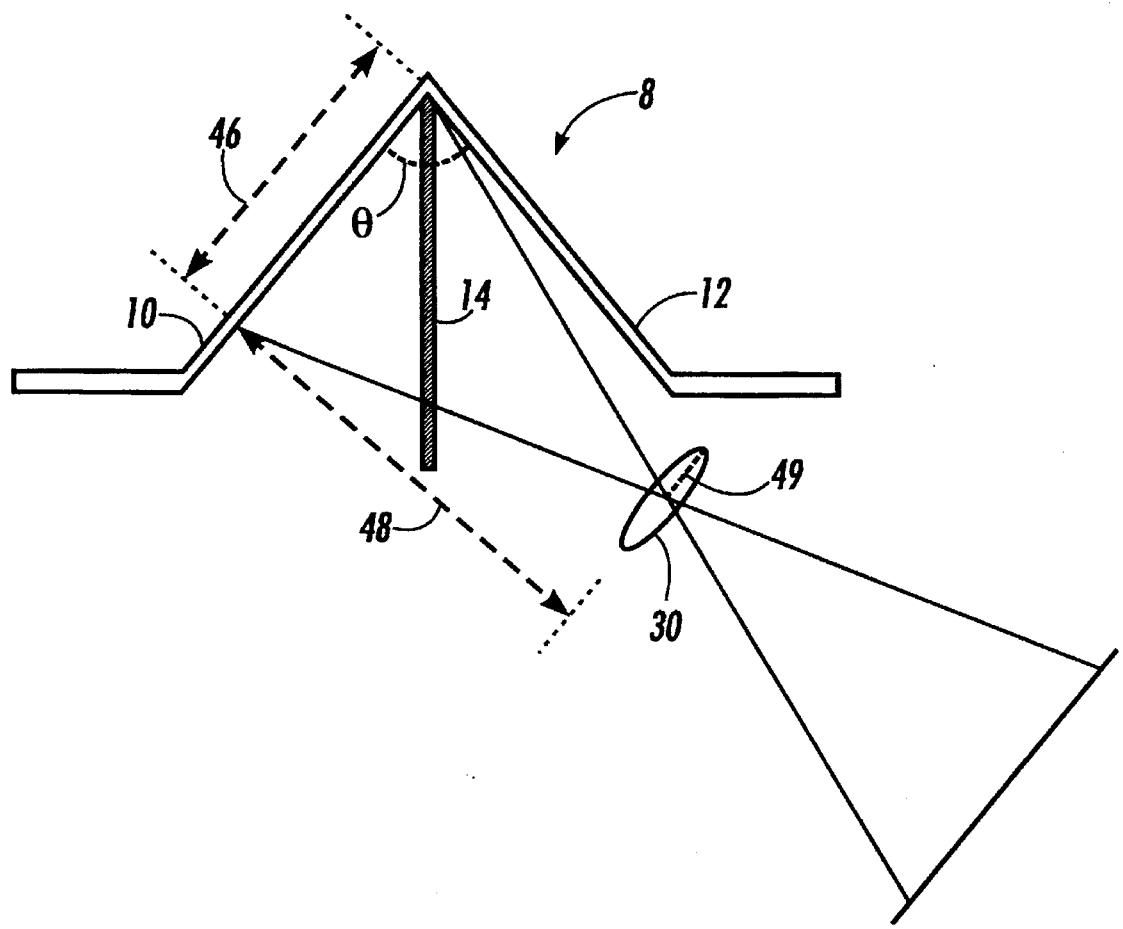
FIG. 3 illustrates physical constraints of one embodiment of the scanning system shown in FIGS. 1 and 2.

With reference now to FIG. 3, constraints of the angle of wedge shaped platen 8 of the scanning system 4 are shown in detail. Generally, angle θ between face 10 and face 12 of wedge platen 8 is defined to be less than ninety degrees in order that a bound document being imaged on wedge shaped platen 8 is open as little as possible. It will, however, be understood by those skilled in the art that wedge platen 8 can operate with an angle θ that is greater than or equal to ninety degrees. By minimizing the extent to which a bound document is opened while scanning the pressure to the spine region of a bound document is minimized. The angle θ is minimized to the extent that the wedge shaped platen 8 does not interfere with the projection path of scanning system 4, which is described in detail later.

In a preferred embodiment, angle θ is selected such that the outermost ray of light reflecting off of mirror 14 or side 10 of platen 8 is not eclipsed by side 12 of platen 8 from transmitting through lens or optical system 30. Assuming a one-to-one projection, the angle θ is constrained to be greater than or equal to the $\arctan[2f/(L/2-r)]$, where "2f" is indicated generally by reference number 48, "r" is indicated generally by reference numeral 49, and where "L" is indicated generally by reference number 46. Specifically, "f" is defined herein as the focal length of lens 30, "r" is defined herein as the radius of lens 30, and "L" defined herein as the width of the sensing area on each face 10 and 12 of wedge platen 8. Thus, the size of angle θ between face 10 and 12 of wedge shaped platen 8 is optimal when it minimizes the stress on the spine of a bound document while not interfering with the projection path of the imaging system.

Dividing the wedge platen 8 is a mirror 14 that is attached to pivot 15. Pivot 15, which is motorized, rotates mirror 14 between two operational positions. In an alternate embodiment, pivot 15 is operated manually by an operator. The mirror 14 faces side 12 of wedge 8. In the first operational position, illustrated in FIG. 1, mirror 14 is located at the central divide of the wedge shaped platen 8. Correspondingly, in the second operational position illustrated in FIG. 2, mirror 14 is located immediately adjacent face 12 of platen 8. Depending on the angle θ, shown in FIG. 3, between face 10 and 12, mirror 14 is rotated a predetermined distance between each operational position shown in FIGS. 1 and 2. As depicted generally by arrow 17 in FIG. 1, mirror 14 is returned to the first operational position after side 20 of bound document 6 is imaged. Correspondingly, as depicted generally by arrow 18 shown in FIG. 2, mirror 14 is rotated to the second operational position after side 22 of bound document 6 is imaged.

Opposing sides 20 and 22 of bound document 6 resting face down on platen 8 are illuminated by flash lamp or light source 23. Lamp 23 includes a reflector and three individual light sources that selectively emit the primary colors red, green, and blue (RGB). FIGS. 1 and 2 illustrate flash lamp 23 illuminating both sides 22 and 20 of bound document 6, respectively. It will be appreciated, however, by those skilled in the art that light source 23 can comprise any lighting arrangement suitable for recording color or black and white images. Thus, light source 23 can be any arrangement that emits white light, a single primary color, or a combination of primary colors. The specific light source used in any embodiment depends on the type of input document (e.g. color or black and white) and the form of a recorded image (e.g. colors or gray scale).

With reference initially to FIG. 1 where mirror 14 is in the first operational position, flash lamp 23 illuminates side 22 of bound document 6 with a short-lived flash of light. Reflected illumination from the page of side 22 travels along a path depicted generally by ray 28, reflecting off of mirror 14 before passing through focal optics 30 and projecting onto two-dimensional sensor array or imager 32. With reference now to FIG. 2 where mirror 14 is in the second operational position, flash lamp 23 illuminates side 20 of bound document 6 with a flash of light. Reflected illumination from the page of side 20 travels along a path depicted generally by ray 28, unlike ray 28, is transmitted directly onto imager 32 as focused by optics 30. It will be appreciated by those skilled in the art that optics 30 are generally depicted in FIGS. 1 and 2. The optics 30 may be a traditional combination of lenses, apertures, mirrors and other optical elements designed to focus, reduce, enlarge, or fold images from sides 20 and 22 of wedge shaped platen 6 onto imager 32. It will be understood by those skilled in the art that magnification or reduction can be performed either by digital image processing techniques or by moving the combination of lenses forming optics 30.

Image data that is detected by the single page imager 32 has either been reflected by or transmitted unobstructed by mirror 14. It will be appreciated by those skilled in the art that any sensor array or imager 32 that is adapted to record documents in contact with either side 10 or side 12 of wedge shaped platen 8 will suffice for the purposes of the present invention. The present invention operates using an active or a passive imaging system that detects a single page of a bound document sensed thereon. In the preferred embodiment, imager 32 is an array of active photosensor that converts optical image data represented by beams 28 or 34 into electrical image signals. Active photosensor arrays include imagers such as a flat panel detector, and a charge coupled device (CCD). As a flat panel detector, imager 32 comprises an array of thin film transistors and sensors that function as pixel element detectors. These thin film elements are generally constructed over a translucent substrate such as glass, forming a two dimensional detecting surface. An example of the thin film arrays are disclosed in U.S. Pat. No. 5,017,989 to Street et al., the pertinent portions of which are incorporated herein by reference. Alternatively, imager 32 can comprise a two-dimensional CCD photosensitive array, or a one-dimensional CCD photosensitive array that sequentially scans each side of the image plane using a movable optical carriage system. An example of a scanning carriage system using a CCD is disclosed in U.S. Pat. No. 5,276,530, the pertinent portions of which are incorporated herein by reference.

Once an image is projected from either side 20 or 22 of bound document 6 onto imager 32, electrical representations are read out of array 32 by suitable electronics in the form of digital image data and transmitted to an electronic subsystem (ESS) 38. At the ESS 38, the digital image data may either undergo further image processing or it may be stored on a storage device 40 which may include RAM, flash memory, floppy disk, or another form of optical or magnetic storage. Generally, ESS 38 includes a microprocessor and control software responsive to user or system demand for the processing and routing of image data. Image dam stored on storage device 40 can be transmitted by ESS 38 through port 42 to other devices such as an electronic printer or facsimile for hard copy reproduction.

In an alternate embodiment, imager 32 comprises a passive photosensor such as a photoreceptor, or photographic film, or any other material that is sensitive to fight. As a photoreceptor, imager 32 is regulated by ESS 38 which uses operating software stored in a memory (not shown) to control various stations (not shown) of imager 32. Generally, the photoreceptor is in the form of a movable belt or drum which is charged at a charging station to a relatively high, substantially uniform potential. Next, the charged photoconductive belt is advanced through imaging station 32 at which light rays reflected from one of the pages of the bound document 6 being copied on wedge shaped platen 8, as described above, create an electrostatic latent image on the photoconductive surface.

In the event imager 32 is a photoreceptor, ESS 38 must insure that the intensity of flash lamp 23 is sufficient to expose the surface of the photoreceptor, and that the speed at which the photoreceptor belt or dram is traveling is matched to the duration of the flash exposure. If the speed of the belt or drum is too great then excessive blurring of the latent image will occur. Subsequently, the electrostatic latent image is developed at a development station by a developer unit, such as a magnetic brush development unit, (not shown) and the developed image is transferred at a transfer station to a copy sheet supplied from a paper tray (not shown). Following transfer, the copy sheet beating the transferred image is fed to a fusing station where a fuser (not shown) permanently affixes the toner powder image to the copy sheet. Such electrophotographic systems are well known in the art, an example of which is disclosed in U.S. Pat. No. 5,322,970, the pertinent portions of which are incorporated herein by reference.

In operation, ESS 38 is coupled to pivot 15, flash lamp 23, storage device 40, output port 42, scan switch mechanism 44, and imager 32. After detecting a start scan signal from switch 44, ESS 38 acts as a driver to each coupled component for synchronous flash exposure of side 20 and 22 of bound document 6 using lamp 23 once mirror 14 is positioned into operational position two and operational position one, respectively. Specifically, before flash exposure of side 20 of bound document 6, ESS 38 directs pivot 15 through control line 16 to rotate counter-clockwise until mirror 14 is substantially adjacent to side 12 of platen 8 (as shown in FIG. 2). Correspondingly, before flash exposure of side 22 of bound document 6, ESS 38 directs pivot 14 through control line 16 to rotate clockwise until mirror 14 is properly positioned between the two sides 10 and 12 of wedge 8. In addition, ESS 38 insures proper timing between exposures by lamp 23 so that previously sensed image data is fully recorded on storage device 40 before subsequent exposure of imager 32 to a new image.

Figure 4:
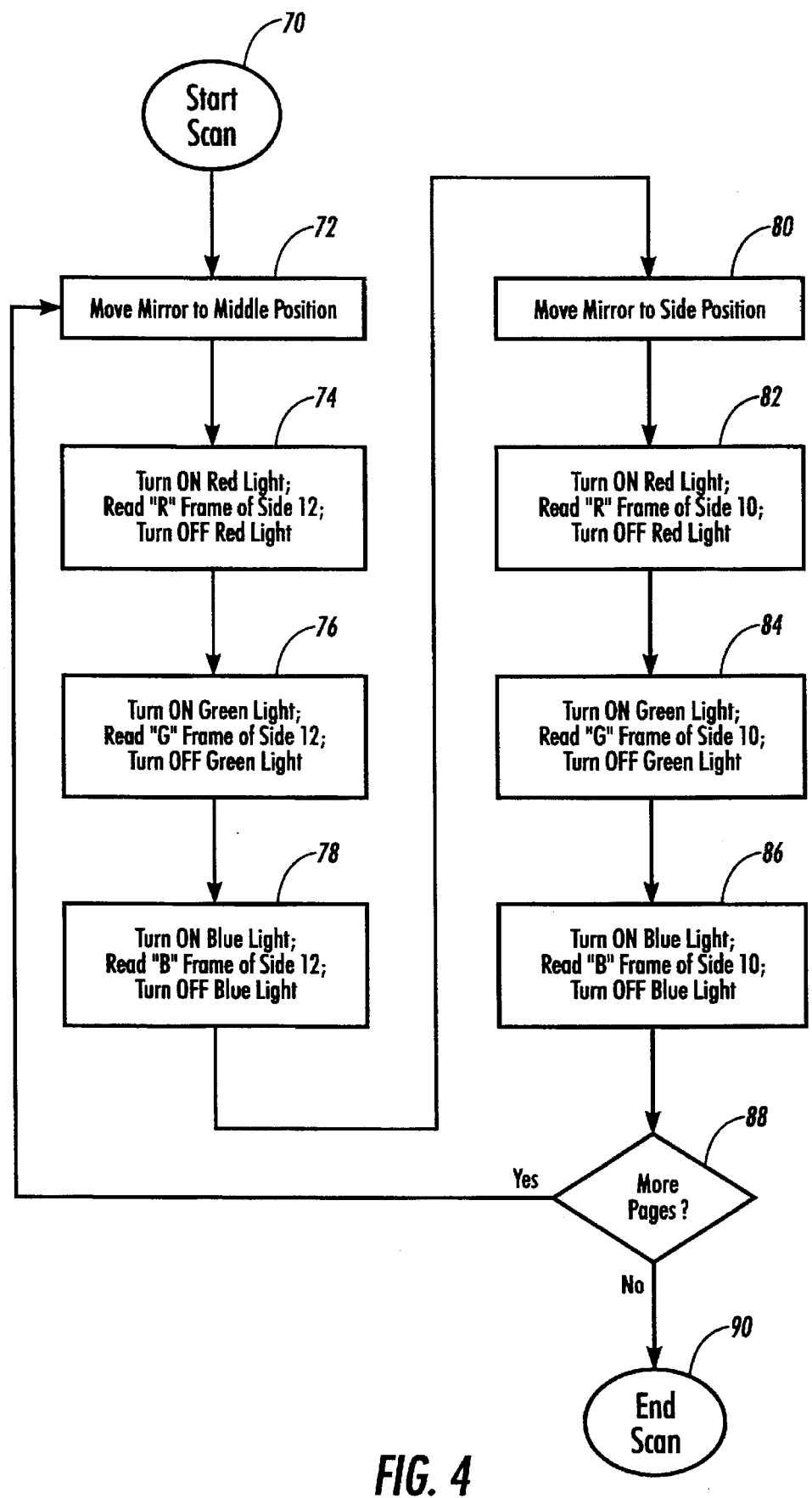
FIG. 4 is flow chart showing the general steps involving the operation of the scanning system.

FIG. 4 is a flow diagram illustrating control steps of scanning system 4 in operation. At step 70, ESS 38 senses that scan switch mechanism 43 has been invoked by an operator. Subsequently at step 72, ESS 38 directs pivot 15 through control line 16 to rotate mirror 14 to the first operational position. The first operational position which is between sides 10 and 12 of wedge scanner 8 is shown generally in FIG. 1. After positioning mirror 14, ESS 38 rams ON and directs the red light source of lamp 23 to side 10 of platen 8, at step 74. After exposure by the first primary color, red, ESS 38 reads a digital representation of side 22 of bound document 6 from imager 32. The digital representation contains information defining parts of side 22 of bound document 6 that are sensitive to red light. ESS 38 either stores the digital representation on storage device 40 or outputs the digital representation through port 42 as described above. Once the digital representation is detected and recorded by imager 32, the red light source of lamp 23 is turned OFF. Steps, 76 and 78 repeat step 74 except that the red light source of lamp 23 is substituted for the green light source and the blue light source of lamp 23. After completing steps 74, 76, and 78 for each of the red, green, and blue primary colors, the three digital representations of each primary color are then combined to derive an image having both intensity and color hue of side 22 of document 6.

Figure 5:
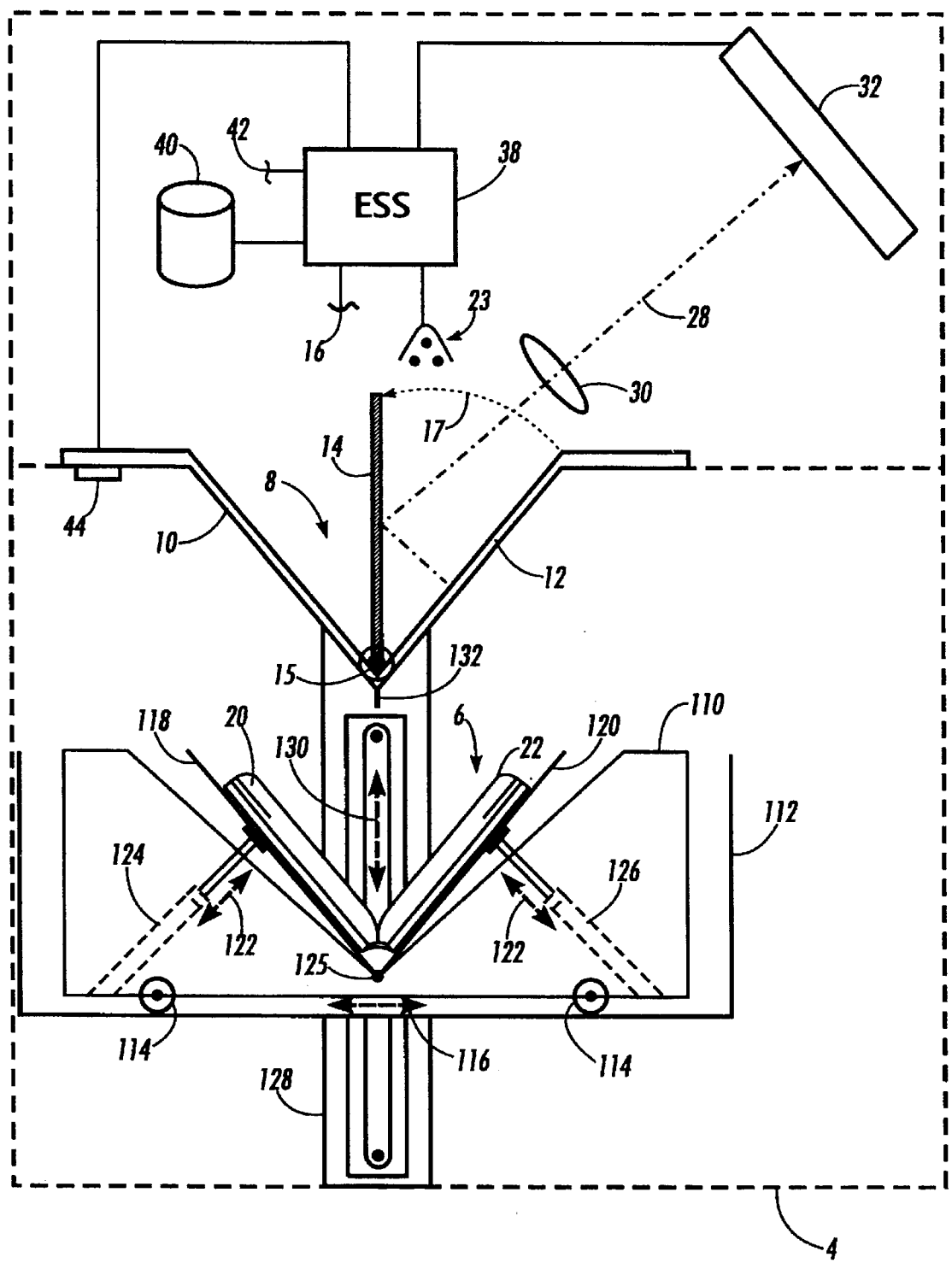
FIG. 5 is an alternate embodiment of the present invention in which a bound document is scanned in an open and upright position.

FIG. 5 is an alternate embodiment incorporating the invention in which scanning system 4 is inverted relative to scan bound document 6 in an open and upright position. In this embodiment, scanning system 4 includes a carriage 110 that is supported in a seating cavity 112. Rollers 114 move the carriage 110 laterally relative to the seating cavity 112 as indicated by arrow 116. The lateral movement of carriage 110 insures that the center of bound document 6 between sides 20 and 22, which varies depending on which pages to which bound document 6 are open, is centered in the middle of wedge platen 8. A pair of pivotally mounted support plates 118 and 120 are each secured to the carriage 110 by pistons 124 and 126, respectively, for angular movement about edge 125 as indicated by arrows 122. A drive assembly 128 moves the seating cavity 112 in a direction indicated by arrow 130. A position sensor 132 located at the apex of wedge platen 8 is retractable therein upon contact with bound document 6. ESS 38 communicates with drive assembly 128 to move seating cavity 112 vertically relative to wedge platen 8, and with rollers 114 to move the carriage laterally relative to the seating cavity 112. In response to a start scan signal from start scan switch mechanism 44, ESS 38 controls movement of the drive assembly 128 and rollers 114 to position bound document 6 is in contact with wedge platen 8 for scanning. In addition, ESS actuates pistons 124 and 126 to ensure that pages of bound document 6 are firmly in contact with each side of wedge platen 8. Once each side of bound document 6 has been recorded by imager 32, ESS 38 actuates drive assembly 128 to lower seating cavity 112 away from wedge platen 8.

It should be understood by those skilled in the art that position sensor 132 can alternatively be a magnetic or capacitive proximity sensor, or an optical detector. It will further be appreciated that scanning system 4 can be modified to incorporate functions a system that automatically turns pages of a bound document. Examples of systems that turn pages of bound documents are disclosed by Turner et al. in U.S. patents applications Ser. No. 08/570,880 entitled "Bound Document Imager with Page Turner" to Turner et al., filed on Dec. 12, 1995 and assigned to the same assignee as the present invention, and U.S. patent application Ser. No. 08/570,791, which are incorporated herein by reference.

After imaging side 12 of platen 8, ESS 38 directs pivot through control line 16 to rotate mirror 14 to the second operational position. In the second operational position, mirror 14 is rotated out of the optical path between side 10 of platen 8 and imager 32, as shown generally in FIG. 2. Similar to steps 74, 76, and 78, corresponding steps 82, 84, and 86 are performed on side 10 of platen 8 subsequent to completing step 80. After completing steps 82, 84, and 86, an image having both intensity and color hue of side 20 of document 6 is recorded on storage device 40 or output through port 42 as coordinated by ESS 38. At step 88, ESS 38 determines whether more pages are to be scanned by detecting a signal from switch mechanism 43. After step 86 and before repeating step 72, it is assumed that an operator will turn the page of bound document 6 before invoking the scan switch 43. If no start-scan signal is detected from switch mechanism 43, ESS 38 remains in a ready scan state at step 90. It will be readily understood by those skilled in the art that steps 74, 76, and 78, and corresponding steps 82, 84, and 86 can occur in any order so long as ESS 38 correctly combines images representing the primary colors of each respective side once all the steps have completed. It will also be understood by those skilled in the art that scanning system 4 can be readily modified to have imager 32 record gray scale representations of black and white images. To record a black and white image, a single illumination and recording step is performed in place of steps 74, 76, and 78, and corresponding steps 82, 84, and 86. Specifically the single step consists of recording a gray scale representation of sides 10 and 12 after exposing each side with white light or one of the three primary colors red, green, or blue.

It will no doubt be appreciated that there are a number of possible manners in which to implement the scanning system 4. One aspect of the invention is a wedge shaped platen having positioned therebetween a mirror. Another aspect of the invention is that the mirror pivots between a first and a second operational position. These aspects of the present invention enable sequential imaging of opposing pages of a bound document with a single page imager. The imager can be formed using active or passive devices that include: a two-dimensional array of amorphous silicon, a CCD array, a photoreceptor, or photographic film. Furthermore, the single active or passive imaging system, which can be sensitive to color or gray scale, detects pages of a bound document reflected thereon by each of the three primary colors red, green, and blue. It will further be appreciated by those skilled in the art that reductions and enlargements of a side of bound document 6 can be achieved by altering the position and makeup of optics or optical system 30.

It will also be appreciated that scanning system 4 can be read fly modified to include job level programming as described by Rourke et al. in U.S. Pat. No. 5,119,206. Job level programming can include programming that manages input scanning as well as output rendering. Programming options for scanning bound documents include input commands for specifying whether to scan one or both sides of a bound document. Programming options for rendering scanned images of a bound document include specifying whether opposing sides of a bound document are to be printed on a common print media sheet or on separate print media sheets.

Sequential control of scanning system 4 in ESS 38 may be readily implemented in software using software development environments that provide portable source code that can be used on a variety of hardware platforms. Alternatively, the disclosed system may be implemented partially or fully in hardware using standard logic circuits. Whether software or hardware is used to implement the system varies depending on the speed and efficiency requirements of the system and also the particular function and the particular software or hardware systems and the particular microprocessor or microcomputer systems being utilized. The system, however, can be read fly developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

I claim:

1. An apparatus for scanning a bound document, comprising:

a wedge shaped platen having a first transparent surface and a second transparent surface for supporting the bound document in an open condition;

a light source for illuminating a first opposing page and a second opposing page of the bound document positioned on the first and the second transparent surface of said wedge shaped platen;

an imager for capturing images of the first and the second opposing pages of the bound document on said wedge shaped platen one page at a time; and a mirror having a first position when imaging one page, and a second position when imaging the other page, the first position defining a reflective path between the first transparent surface and said imager, and the second position defining a direct optical path between the second transparent surface and said imager.

2. An apparatus according to claim 1, wherein said fight source selectively emits red light, green light, and blue light.

3. An apparatus according to claim 2, further comprising a controller for coordinating sequential illumination of the first opposing page and the second opposing page of the bound document with said light source on said imager, said controller positioning said mirror in the first position before illuminating the first opposing page of the bound document, and positioning said mirror in the second position before illuminating the second opposing page of the bound document.

4. An apparatus according to claim 1, wherein said light source emits white light.

5. An apparatus according to claim 1, further comprising a pivot coupled to said mirror, said pivot rotating said mirror into the first position and the second position.

6. An apparatus according to claim 1, further comprising a storage medium for storing an image from said imager representing the first opposing page and an image representing the second opposing page of the bound document.

7. An apparatus according to claim 1, wherein said imager comprises a photoreceptor.

8. An apparatus according to claim 1, wherein said imager is a two-dimensional array of amorphous silicon sensors.

9. An apparatus according to claim 1, wherein the first transparent surface and the second transparent surface of said wedge shaped platen are offset by an angle of less than ninety degrees.

10. An apparatus according to claim 1, further comprising an optical system for projecting an image of the first opposing page and an image of the second opposing page of said bound document onto said imager.

11. An apparatus according to claim 1, wherein said imager further comprises an image plane with a region onto which images of the first and the second opposing pages of the bound document on said wedge shaped platen are projected in succession.

12. An apparatus according to claim 1, wherein images of the first and second opposing pages of the bound document on said wedge shaped platen are projected onto coextensive regions of said imager.

13. An apparatus according to claim 1, wherein said mirror is a one-sided mirror.

14. A method for scanning a bound document supported on a wedge shaped platen having a first transparent surface and a second transparent surface, comprising the steps of:

(a) positioning a mirror in a defined reflective path between one of the first and the second transparent surfaces and an imager;

(b) illuminating a first opposing page of the bound document positioned on one of the first and the second transparent surfaces of the wedge shaped platen;

(c) recording with the imager a representation of the first opposing page illuminated along the defined reflective path;

(d) repositioning the mirror so as to provide a direct optical path between the other of the first and the second transparent surfaces and the imager;

(e) illuminating a second opposing page of the bound document positioned on the other of the first and the second transparent surfaces of the wedge shaped platen; and (f) recording with the imager a representation of the second opposing page illuminated along the defined optical path.

15. The method according to claim 14, further comprising the step of detecting a start scan signal from a switch.

16. The method according to claim 15, further comprising the step of repeating steps (a) through (f) in response to said detecting step.

17. The method according to claim 14, further comprising the step of turning a page of the bound document after completing steps (a) through (f).

18. The method according to claim 17, further comprising the steps of repeating steps (a) through (f) after completing said turning step.

19. The method according to claim 14, wherein said steps (b), (c), (e), and (f) are repeated for each primary colors red, green, and blue.

20. The method according to claim 19, further comprising the step of forming a composite image using each representation recorded by said recording step (c).

21. An apparatus for scanning a bound document, comprising:
- a wedge shaped platen having a first transparent surface and a second transparent surface for supporting the bound document in an open condition;
- means for illuminating a first opposing page and a second opposing page of the bound document positioned on the first and the second transparent surface of said wedge shaped platen;
- means for capturing images of the first and the second opposing pages of the bound document on said wedge shaped platen one page at a time; and
- a mirror having a first position when imaging one page, and a second position when imaging the other page, the first position defining a reflective path between the first transparent surface and said imager, and the second position defining a direct optical path between the second transparent surface and said imager.

22. An apparatus according to claim 21, wherein said illuminating means selectively emits red light, green light, and blue light.

23. An apparatus according to claim 22, further comprising means for coordinating sequential illumination of the first opposing page and the second opposing page of the bound document with said light source on said imager, said coordinating means positioning said mirror in the first position before illuminating the first page of the bound document, and positioning said mirror in the second position before illuminating the second page of the bound document.

* * * * *